United States Patent [19]

Collins

[11] Patent Number: 4,502,698
[45] Date of Patent: Mar. 5, 1985

[54] ROTARY FACE SEAL WITH FLEXIBLE ANNULAR BOOT

[75] Inventor: Michael T. Collins, Boulder, Colo.

[73] Assignee: P and C Engineering and Development, Boulder, Colo.

[21] Appl. No.: 633,045

[22] Filed: Jul. 20, 1984

[51] Int. Cl.³ .............................................. F16J 15/36
[52] U.S. Cl. ...................................... 277/43; 277/50;
277/82; 277/84; 277/89; 277/93 SD
[58] Field of Search ...................................... 277/38–43,
277/81 R, 82, 84, 88–90, 93 R, 93 SD, 50

[56] References Cited

U.S. PATENT DOCUMENTS

| 2,245,106 | 6/1941 | Karlberg | 277/93 X |
|---|---|---|---|
| 2,399,764 | 5/1946 | Schilling | 286/11 |
| 2,695,799 | 11/1954 | Chambers et al. | 286/11 |
| 2,722,439 | 11/1955 | Brummer et al. | 277/42 |
| 2,984,506 | 5/1961 | Andresen et al. | 286/11 |
| 2,994,547 | 8/1961 | Dolhun et al. | 286/11.13 |
| 3,355,178 | 11/1967 | Hornaday | 277/87 |
| 3,370,856 | 2/1968 | Buske | 277/89 |
| 3,887,200 | 6/1975 | Engelking et al. | 277/88 |
| 4,095,807 | 6/1978 | Jandt et al. | 277/40 |
| 4,212,473 | 7/1980 | Arai | 277/81 |
| 4,243,233 | 1/1981 | Arai | 277/81 |
| 4,275,889 | 6/1981 | Butler et al. | 277/42 |

FOREIGN PATENT DOCUMENTS

| 564659 | 10/1958 | Canada | 277/89 |
|---|---|---|---|
| 896876 | 1/1954 | Fed. Rep. of Germany | 277/43 |
| 397015 | 2/1909 | France | 277/90 |
| 1141040 | 3/1957 | France | 277/38 |
| 851246 | 10/1960 | United Kingdom | 277/42 |

Primary Examiner—Robert S. Ward
Attorney, Agent, or Firm—John E. Reilly

[57] ABSTRACT

A rotary seal interposed between an axially and rotatably movable shaft and stationary housing, the seal having a flexible annular boot or diaphragm mounted in surrounding relation to the shaft and terminating in an outer peripheral margin which abuts a seal ring, the seal ring having a tapered face engaging a sloped surface on the outer stationary housing. A spring-loaded member urges the seal ring into firm engagement with the housing portion, and the outer free end of the boot is free to be radially displaced along its interface with the seal ring while urging the seal ring in an axial direction firmly into engagement with the sloped portion on the stationary housing.

15 Claims, 4 Drawing Figures 4,502,698

ROTARY FACE SEAL WITH FLEXIBLE ANNULAR BOOT

This invention relates to rotary seals, and more particularly relates to a novel and improved durable, effective oil seal assembly between a stationary housing and a rotatable and axially movable shaft, the seal assembly being specifically adaptable for use as a wheel oil seal between an axle and spindle in automotive applications.

BACKGROUND OF THE INVENTION

Numerous applications require a durable, effective seal between an outer stationary housing containing a fluid reservoir and a rotatable and axially movable shaft within the housing. A typical application is in a wheel oil seal between the axle of a motorized vehicle and an outer surrounding spindle where it is important to prevent contaminants, such as, dirt, water, dust from flowing inwardly past the inboard side of the spindle and into the spindle so as to subject bearings, axles or other components to damage or extreme wear; and further to prevent the flow of oil and grease out of the inboard side of the spindle thereby aiding in the protection of parts inside the spindle and on the outboard side of the spindle. It is therefore desirable to construct a seal assembly with a seal ring which has the ability to maintain a constant pressure both in axial and radial directions so as to remain seated irrespective of any pulsating or translational movement of the axle as it moves inwardly or outwardly with respect to the spindle. Further, it is important that a constant pressure be maintained over the entire circumference of the seal ring notwithstanding any axle biasing which may occur in a radial direction as the axle spins. The seal must further remain seated notwithstanding changes in atmospheric pressure or changes in pressure which may occur as a result of translational axle movement. Rotary or shaft seals have been devised which employ a boot or diaphragm where one end of the diaphragm is attached and the other is free to slide axially in response to shifting between a shaft and outer housing. Representative of such seals are those disclosed in U.S. Pat. No. 2,984,506 to R. H. Andresen et al. Other representative patents are U.S. Pat. Nos. 2,399,764 to R. Schilling; 2,695,799 to A. M. Chambers et al; 2,994,547 to L. N. Dolhun et al; 3,355,178 to J. R. Hornaday; 3,370,856 to G. E. Buske; 3,887,200 to F. S. Engelking et al; 4,095,807 to S. Jandt et al; and 4,275,889 to G. K. Butler et al. Also seal rings have been devised for sealing between end surfaces of a rotary member and stationary member, such as, those disclosed in U.S. Pat. Nos. 4,243,233 and 4,212,473 to Y. Aria. It is proposed in accordance with the present invention to employ a rotary seal assembly made up of a combination of a boot or diaphragm-type seal which is fixed at one end to one of a stationary and rotary member with the other end bearing against a seal ring, the seal ring having a tapered surface which engages a correspondingly sloped surface on the other of the stationary and rotary members. The interface between the boot and seal ring are effectively fixed against relative movement in an axial direction, but the boot is free to be displaced with respect to the seal ring in a radial direction and is further capable of flexing in response both to axial and radial movement. In this way, the seal ring is capable of remaining seated notwithstanding pulsating or translational movement of the axle and can maintain a constant pressure over its entire circumference notwithstanding any axle biasing which may occur in a radial direction as the axle is rotated.

SUMMARY OF THE INVENTION

It is therefore an object of the present invention to provide for a novel and improved rotary seal between a relatively movable housing and shaft members and wherein the seal is of long lasting, durable construction.

Another object of the present invention is to provide for a novel and improved seal assembly between a spindle and axle wherein the seal is self-compensating for wear and is capable of preventing leakage of oil or grease past the ring.

It is a further object of the present invention to provide for a novel and improved wheel oil seal capable of preventing the flow of contaminants past the inboard side of a spindle or end of a spindle so as to prevent damage to bearings, axles or other components as well as to prevent the flow of grease or oil out of the spindle.

It is an additional object of the present invention to provide for a novel and improved construction of a wheel oil seal which incorporates the most favorable characteristics of a flexible boot and relatively rigid seal ring in cooperation with one another and which is highly versatile and conformable for use in various applications.

In accordance with the present invention, there has been devised a novel and improved form of oil seal assembly wherein an annular stationary member is disposed in outer concentric relation to an inner member, such as, an axle, the axle being both rotatably and axially movable with respect to the outer member. An outer retaining cup is disposed in a recessed portion in said outer member and has a radially directed wall merging into an outer, axially directed wall. An inner retainer portion is disposed on the inner member and has a radially directed wall portion to serve as a spring seating member. A novel and improved form of flexible boot is of annular, generally S-shaped configuration having one end bearing against the spring seating member and an opposite end mounted under compression against a backing plate at the outer free end of the boot. A seal ring is affixed to the outer free end of the boot and is composed of a relatively inflexible, low coefficient of friction material defining a radially outward extension of the boot which is biased by the spring into firm engagement with the retaining cup; and the backing plate and spring are radially slidable with respect to the seal ring so that the seal ring will maintain a fixed alignment with the retaining cup while being rotatable with respect to the cup.

Other objects, advantages and features of the present invention will become more readily appreciated and understood when taken together with the following detailed description of a preferred embodiment in conjunction with the accompanying drawings, in which:

DETAILED DESCRIPTION OF THE PREFERRED EMBODIMENT

Figure 2:
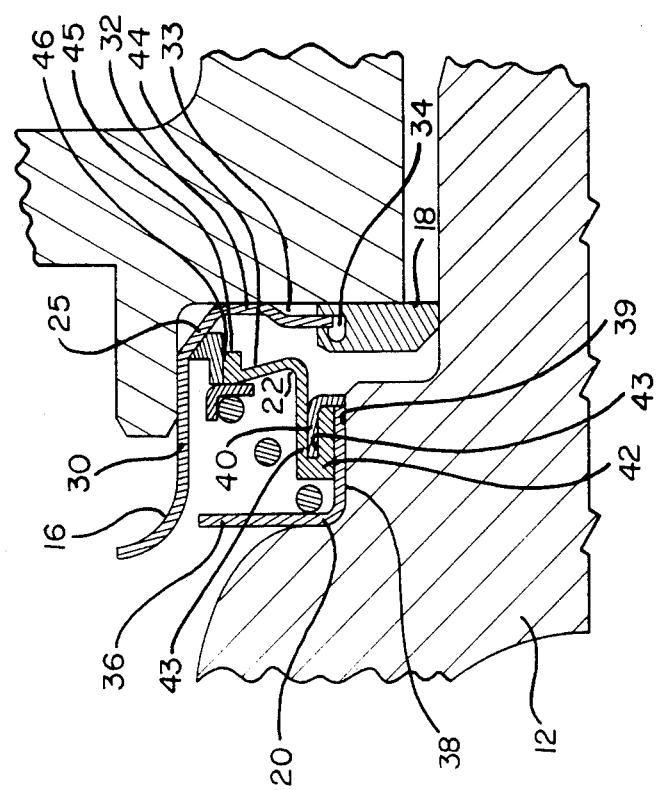
FIG. 2 is a sectional view similar to FIG. 1 and illustrating the translational movement of certain elements of the preferred form of seal assembly.
Figure 1:
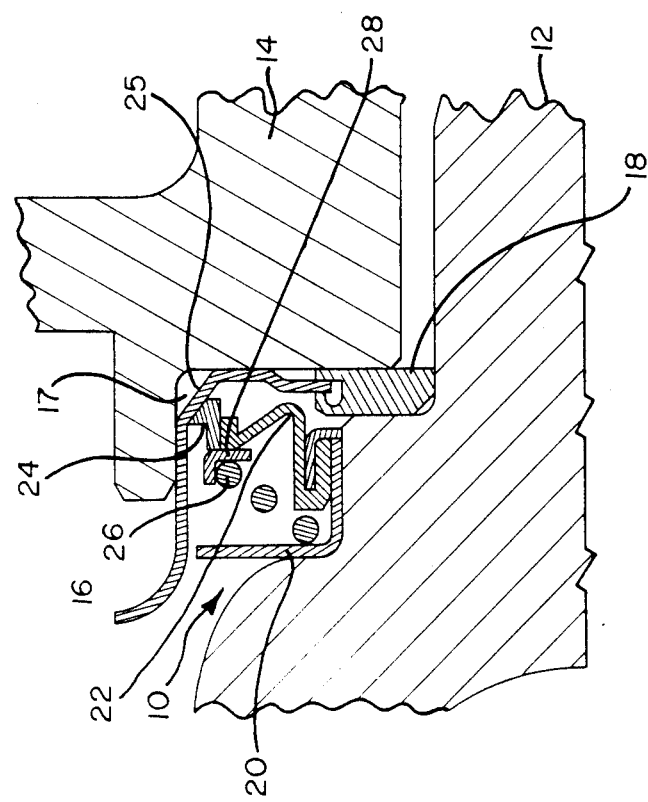
FIG. 1 is a sectional view through a preferred form of rotary seal assembly in accordance with the present invention.
Figure 3:
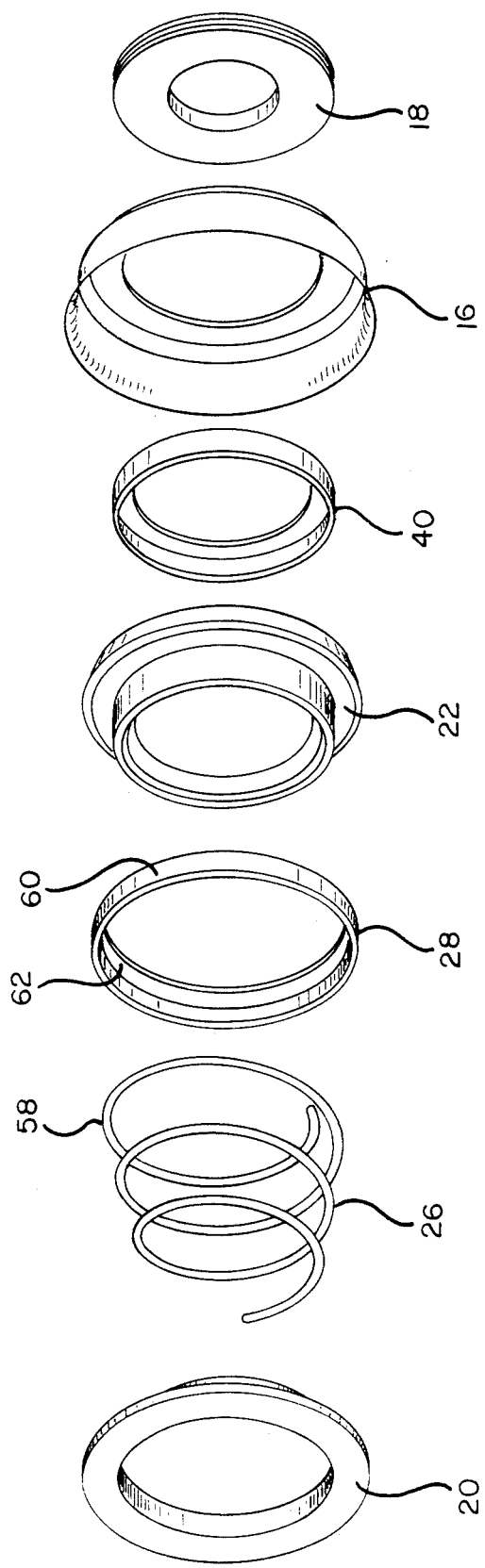
FIG. 3 is an exploded view of the preferred form of seal asembly in accordance with the present invention.
Figure 4:
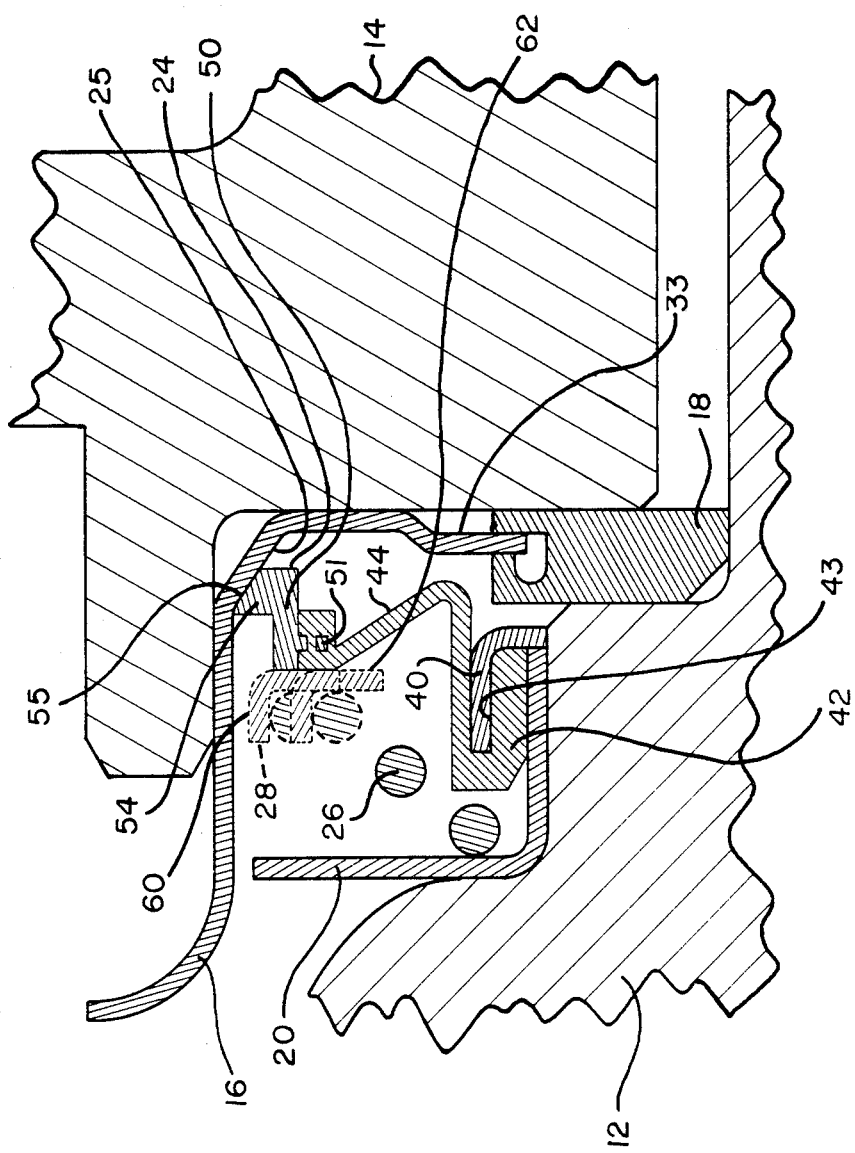
FIG. 4 is an enlarged view of the preferred form of seal assembly and illustrating the radial displacement between the seal proper and its spring-loading member in accordance with the present invention.

Referring in detail to FIGS. 1 to 4, there is illustrated a preferred form of seal assembly generally designated at 10 interposed between a drive shaft or axle 12 and outer stationary housing or spindle 14. For example, the axle may be the drive axle in a motorized vehicle with the stationary housing or spindle portion 14 mounted in outer spaced concentric relation to the shaft. The preferred form of seal assembly 10 is mounted between the axle and housing and is broadly comprised of an outer retaining cup 16 mounted in a recessed portion 17 at one end of the spindle 14, the retaining cup 16 terminating at one end in an annular thrust washer 18. A flinger or inner backing plate 20 is disposed on the axle 12 in facing relation to the retaining cup and serves to support a flexible annular boot 22 in fixed relation to the axle, the boot having an outer seal ring 24 urged into sealed relation to a sloped surface 25 on the retaining cup by a compression spring 26 which is interposed between the flinger 20 and outer backing plate or end stop 28 for the opposite end of the spring 26, the outer backing plate 28 bearing against the seal ring 24 and outer free end of the boot 22.

Considering in more detail the construction and arrangement of individual parts of the preferred embodiment of the present invention, the retaining cup 16 is of generally L-shaped cross-section to conform to the recessed portion 17 at the end of the spindle and has an axially extending cylindrical flange 30 merging into the sloped wall surface 25 which is formed at the outer extremity of a radially inwardly extending flange 32. The flange portion 32 is stepped or offset as at 33 away from the end wall of the spindle to form an inner end adapted for insertion into an annular groove 34 at the outer peripheral edge of the annular thrust washer 18. Similarly, the flinger 20 is of generally L-shaped cross-section having a radially outwardly extending flange 36 and an axially extending cylindrical flange 38 mounted on a shoulder 39 of the axle 12. A compressor ring 40 is disposed at the free end of the flange 38 to facilitate mounting of the annular boot 22 in fixed relation to the flange 38 and the axle 12 in a manner to be hereinafter described. Generally it should be noted that the retaining cup 16 and flinger 20 in effect form the outer walls of the seal assembly, and the flinger is shown as being disposed somewhat inside the retaining cup 16, although it could be displaced axially with respect to the retaining cup 16 so that the flange 36 is disposed outboard of the flared end of the cup 16. The gap between the interfacing walls of the retaining cup 16 and flinger 20 remain constant despite any translational movement of the axle or shaft 12 so as to insure that no particles larger than a given tolerance can pass into the seal area between the elements 16 and 20. The retaining cup 16 can be made of any material which is hard enough and sufficiently smooth to promote a good sealing surface for the sealing ring and is preferably made out of a steel composition which is easy to form and can be polished or burnished to a smooth surface on its sealing face. Similarly, the flinger 20 can be made out of steel and is dimensioned to be pressfit into place on the shoulder 39 of the axle 12 to permit firm seating of the inner radial edge of the boot 22.

The annular boot 22 is preferably composed of a rubber or rubber-like material which is impervious to liquids and solids and at the same time is characterized by possessing the properties of good fatigue, abrasion and heat resistance. Preferably, the boot 22 is of generally S-shaped configuration having a relatively thick, inner seating end portion 42 which is grooved or recessed as at 43 to receive the outer free end of the ring 40 which serves to compress the inner end 42 of the boot firmly against the flange portion 38. Proceeding in a radially outward direction from the seating portion 42, the boot comprises an axially extending flexible portion 43 which extends inboard beyond the compression ring 40 and merges into a radially outwardly extending column 44, the latter terminating in an outer, relatively thick peripheral rim 45. Preferably, the rim 45 is generally rectangular in cross-section and extends axially in outer spaced concentric relation to the axially extending portion 43 with a flat circumferential end surface 46 which defines a seating area or surface for mounting of the seal ring 24. Preferably, the radial portion 44 of the boot is relatively straight and serves to act as a slender column or support between the seal ring 24 and axle 12 but where the column is capable of bending under minimal forces. Once bending occurs, the force which is exerted upon the seal ring 24 by the boot 22 remains a constant throughout the translational travel of the axle with respect to the spindle. This constant force and ability to move translationally, when combined with the spring element 26 insures substantially constant pressure on the seal ring 24 notwithstanding translational movement of the axle 12. For this reason, the material composition of the boot 22 should be such as to permit free flexing column of the boot, the boot preferably having a high vicat softening point on the order of 330° F. and can be easily molded.

The seal ring 24 is comprised of an axially directed seat portion 50 provided with a radially inwardly directed continuous rib 51 insertable into a complementary annular groove which is disposed along the external surface of the rim 45. The inboard end of the seal ring has an outward radial projection 54 which terminates at its outer extremity in a tapered surface 55, the latter sloped at an angle corresponding substantially to the angle of the sloped wall 25 of the retaining cup. The seal ring 24 is preferably of a different material composition than that of the boot 22 but is given some limited flexibility so as to enable it to conform to the sloped surface 25 of the retaining cup. Moreover, there is a slight departure of the angle of the tapered surface 55 from that of the sloped face 25 so as to create a line of intersection along the circumference of the two surfaces whereby the radial and axial pressure exerted by the seal ring 24 against the retaining cup 16 is concentrated along that line of intersection. The sloped wall 25 also transforms the axial pressure more into radial pressure as a result of the wedging engagement between the surfaces.

The characteristics of the seal ring 24 differ from the boot 22 in that it most desirably possesses a low coefficient of friction with a higher pressure velocity limit. As a part of a wheel oil seal, the seal ring will rotate at high speeds with respect to the retaining cup. However, it will be evident that for other applications the material composition requirements may not be as critical particularly with respect to coefficient of friction and high pressure velocity limit. Again, the seal ring is caused to bear against the sloped wall 25 by the compression spring 26 which is mounted under compression between the radial flange 36 of the flinger and the backing plate 28. The spring 26 as shown is of generally conical form and expands from its point of engagement with the inner radial end of the flange 36 outwardly to terminate in an outer, circumferentially extending free end, as represented at 58, which bears uniformly against the backing plate 28. For this purpose, the backing plate 28 is in the form of a generally L-shaped washer having an axially directed flange 60 and a radially inwardly directed flange 62 disposed in surface contact with the flush ends of the rim 45 and seal ring 24. The backing plate is formed of a rigid material such that the spring will apply uniform axially directed pressure along the entire circumference of the seal ring. The flange 60 upon which the seal rides is sufficiently smooth as to allow the seal ring to slide or be displaced in a radial direction, for example, as illustrated in dotted form in FIG. 4 whereby the seal ring will be capable of remaining centered against the sloped wall portion 25 notwithstanding any unevenness or warping in the retaining cup. In the construction of the spring, various types of springs may be employed, such as, a coil spring, wave spring or finger spring having characteristics of a long free length and relatively small spring constant so as to permit the spring to maintain substantially constant pressure on the seal ring 24 notwithstanding axial shifting or translation of the axle 12.

In the assembly of the boot 22 and seal ring 24, the seal ring 24 is so attached as not to permit liquid or fine particles to pass between the ring and the boot. This attachment may be achieved by any suitable form of mechanical or adhesive bond between the two mating surfaces of the seal ring and boot, or in the alternative may be achieved by molding the two components together. For example, the ring may be molded first and then placed as an insert into the boot mold. During molding, the boot material which may, for example, be a polyurethane is injected into the cavity so that the material will bond itself to the inwardly directed rib 51 of the seal ring. The seal ring 24 is given a much higher softening point than that of the boot material 22 so as not to be affected by the molding process.

In order to assemble the seal assembly between the housing portion 14 and the axle 12, the inner free end 33 of the retaining cup 16 is inserted in groove 34 on the thrust washer 18, and the retaining cup 16 is then pressfit into position at the end of the housing. In turn, the flinger 20 is pressfit into position on the axle, and the compression spring 26 in backing plate 28 are assembled on the flinger followed by mounting of the seating portion 42 of the boot and compression ring 40. The axle is then inserted into position such that thrust washer 18 is interposed between the confronting end surfaces on the axle 12 and spindle 14, and the seal ring 24 has its tapered surface 55 bearing firmly against the sloped wall surface 25 of the retaining cup 16 so as to form an edge or line contact along a circumferential line of intersection therebetween. Again, the limited resiliency or flexibility given to the seal ring will permit it to maintain substantially uniform contact notwithstanding any slight irregularities or warpage along the surface. In operation, this uniform line contact is maintained notwithstanding high speeds of rotation of the axle with respect to the spindle. Thus, the seal ring 24 will not shift but instead will remain firmly seated notwithstanding any translational movement between the housing and axle in an axial direction, such translational movement being counteracted by the spring force of the spring member 26 bearing against the backing plate 28 and the seal ring 24. Further, any radial shifting of the axle with respect to the spindle is compensated for by radial movement or shifting of the backing plate 28 with respect to the outer rim 45 of the boot and the axially directed portion 50 of the seal ring.

It will be appreciated from the foregoing that the rotary seal of the present invention is readily conformable for various applications where an effective seal is required between relatively rotating parts or elements whether mounted in concentric relation or end-to-end relation to one another. In this relation, the seal could be mounted on a stationary member, as opposed to the rotating axle 12, with the seal ring 24 engaging an outer concentric rotating member and accomplish the same effective objectives. Of course, the specific configuration of the retaining cup 16 and flinger 20 may vary according to the intended mounting and application of the seal assembly.

It is therefore to be understood that various modifications and changes may be made in the construction and arrangement of elements comprising the preferred embodiment of seal assembly without departing from the spirit and scope of the present invention as defined by the appended claims.

I claim:

1. In a seal assembly wherein an annular member is disposed in outer spaced concentric relation to an inner member, one of said inner and outer members being movable rotatably and axially with respect to the other of said inner and outer members, an outer retaining member disposed in a recessed portion at one end of said outer member having a radially directed flange merging with an outer axially directed flange, and a second retainer portion on said inner member having a radially directed flange portion, the improvement comprising:
    a flexible boot of annular, generally S-shaped cross-sectional configuration having an inner seating portion mounted in sealed, surrounding relation to said inner member, said boot terminating in an outer rim portion;
    a seal ring defining a radially outward extension of said outer rim portion of said boot, said seal ring having an outer retaining member-engaging surface contacting with said outer retaining member; and
    bias means interposed between said inner member and said seal ring to urge said seal ring against said outer retaining member.

2. In a seal assembly according to claim 1, including a sloped interface between said seal ring and said outer retaining member.

3. In a seal assembly according to claim 1, said seal ring having a tapered surface engageable with said outer retaining member.

4. In a seal assembly according to claim 1, said seal ring having a tapered surface and said outer retaining member having a sloped surface engageable with said tapered surface of said seal ring to establish a circumferential line of intersection therebetween.

5. In a seal assembly according to claim 1, said bias means defined by a spring member mounted under compression between said inner member and a backing plate, said backing plate bearing against said seal ring, and said spring member urging said seal ring into firm engagement with said outer retaining member.

6. In a seal assembly according to claim 5, said backing plate being radially slidable with respect to said seal ring.

7. In a seal assembly according to claim 1, said boot having diaphragm means operative to flex radially and axially in response to radial and axial translatory movement between said outer and inner members.

8. In a seal assembly according to claim 1, said seal ring being composed of a relatively inflexible material with respect to said boot and a complementary rib and groove interconnecting said seal ring and said boot.

9. In an oil seal assembly in which a spindle is disposed in outer spaced concentric relation to an inner rotatable shaft member, said inner shaft member movable rotatably and axially with respect to said outer member, an outer retaining cup disposed in a recessed portion at one end of said outer member having a radially directed wall merging with an outer axially directed wall, and an inner retainer portion on said inner member having a radially directed wall portion, the improvement comprising:

a flexible boot of annular configuration having an inner seating portion mounted in sealed, surrounding relation to said inner member, said boot terminating in an outer seating portion;

a seal ring defining a radially outward extension of said outer seating portion of said boot, said seal ring having a tapered surface movable into contact with a sloped surface on said retaining cup; and bias means interposed between said inner member and said seal ring to urge said tapered surface of said seal ring against said outer retaining member.

10. In an oil seal assembly according to claim 9, said boot including a flexible diaphragm interconnecting said inner and outer seating portions.

11. In an oil seal assembly according to claim 9, said tapered surface of said sealing ring disposed at an angle less than that of said sloped surface along a circumferential line of intersection.

12. In an oil seal assembly according to claim 11, a leading edge of said tapered surface contacting said sloped surface under the urging of said spring means.

13. In an oil seal assembly according to claim 9, said spring means defined by a coiled spring member mounted under compression between said inner retainer portion and a backing plate, said backing plate bearing against said seal ring, and said coiled spring member urging said tapered surface into firm engagement with said sloped surface of said outer retaining cup.

14. In an oil seal assembly according to claim 13, said backing plate being radially slidable with respect to said seal ring and said boot, said boot having an annular flexible diaphragm of generally S-shaped cross-sectional configuration movable radially and axially in response to radial and axial translational movement between said outer and inner members.

15. In an oil seal assembly according to claim 9, said seal ring composed of a relatively inflexible material with respect to said boot, and a complementary rib and groove interconnecting said seal and said boot.

* * * * *